July 12, 1966    K. N. SHADE    3,261,005
MULTIPLE PULSE TRAIN TRANSMISSION
Filed March 25, 1964    2 Sheets-Sheet 1

INVENTOR.
KEITH N. SHADE
BY
Andrus & Starke
ATTORNEYS

July 12, 1966 K. N. SHADE 3,261,005
MULTIPLE PULSE TRAIN TRANSMISSION
Filed March 25, 1964 2 Sheets-Sheet 2

INVENTOR.
KEITH N. SHADE
BY Andrus & Starke
ATTORNEYS

United States Patent Office 3,261,005
Patented July 12, 1966

3,261,005
MULTIPLE PULSE TRAIN TRANSMISSION
Keith N. Shade, Wesleyville, Pa., assignor to A. O. Smith Corporation, Milwaukee, Wis., a corporation of New York
Filed Mar. 25, 1964, Ser. No. 354,731
13 Claims. (Cl. 340—179)

This invention relates to multiple train pulse transmission and particularly to an electrical circuit wherein a plurality of time paralleled pulse trains are transmitted to actuate a single load device or the like.

In recording applications and controls, a plurality of functions may be interconnected to simultaneously actuate a single load device. Thus, in the metering of flow through a number of dispensing lines, the total flow may be recorded by generating trains of time spaced electrical pulses with the pulse repetition rate in each train being proportional to the individual flow through a related dispensing line. The pulse trains are connected to energize a single recording device, a control device or other load. A pulse separating circuit is preferably interposed between the pulse trains and the load to separate simultaneously generated pulses in different pulse trains. A particularly advantageous and highly reliable pulse separating and transmitting circuit adapted for use in remote inventory control systems and the like is disclosed in the copending application of Walter L. Probert entitled Pulse Separating and Transmitting Circuit which was filed March 29, 1963 with Serial No. 269,094 and is assigned to a common assignee herewith. As disclosed in that application, a magnetic scanner sequentially closes control switches in individual transmitting and storage circuits for transmitting in sequence the pulses from a plurality of dispensing units. The circuits employs a self-latching relay system interconnected in a pulsing circuit to maintain a stored pulse.

The present invention is particularly directed to a further simplification in the pulsing circuit in order to minimize the expense and to increase the reliability of the total system.

Generally, in accordance with the present invention, a pair of relays or similar means is provided for each transmitting circuit and interconnected whereby the first or conditioning relay means includes contacts for directly establishing a pulse forming circuit including the second or pulsing relay. The conditioning relay is interconnected in circuit with a transmitter switch coupled to a driven load or other input function and a separate and periodically actuated scanner switching means. The use of a separate switching means is desirable in providing a substantial simplification and reduction in cost of the switching system. Generally, the conditioning relay is connected in series with the transmitting switch and includes contacts connected either in a series or parallel circuit with the scanner switching means. Actuation of the conditioning relay actuates the circuit of the pulsing relay such that energization and de-energization of the conditioning relay is required to transmit each pulse to an output load such as a counter.

In one embodiment of the invention, a normally open transmitting switch is connected directly in series with the conditioning relay to energize the latter. The conditioning relay includes a set of latching contacts connected in series circuit with a scanner switch which is interconnected to maintain energization of the conditioning relay independently of the transmitter switch after initial energization thereof. The conditioning relay further includes a set of contacts interconnected with a pulsing relay such as a relay in series with a capacitor. The contacts of the pulse forming relay are connected in circuit with the load.

In operation, each time the transmitter switch closes, it energizes the conditioning relay which closes its latching contacts to maintain the circuit through the scanner switch. As the scanner rotates, its periodically opens the scanner switch and unlatches the conditioning relay. This will result in a closing of the pulse forming circuit and allow charging of the capacitor to provide a pulsing of the relay.

In an alternative arrangement, the conditioning relay is connected in series with the transmitter switch and the scanner operated switch. It again controls a set of latching contacts and a set of pulsing contacts connected in circuit with the pulse forming relay. The latching contacts are connected however in parallel with the scanner switch such that the initial energization of the conditioning relay is dependent upon a simultaneous closed condition of the transmitter switch and the scanner switch. Thus, in operation, the simultaneous closing of the transmitter switch and the scanner switch effects a latching of the relay contacts. This results in a closing of the pulse forming relay and a transmittal of a pulse to the load. The relay will stay in the latched position until such time as the reed switch opens.

In both cases, it is necessary to have proper overlay of the switch actuating time. Thus, with a normally open switch, it is necessary that the transmitter switch and the scanner switch be simultaneously opened for a period sufficient to allow the conditioning relay to drop out and thereby provide adequate pulsing of the associated pulse forming relay. In the normally closed circuit system, it is necessary that the transmitter switch be in the normally closed position for a time period which overlaps with the periodic closing of the scanner switch in order that each actuation of the transmitter switch will result in energization of the conditioning relay.

In either event, the transmitting relay module for each channel would include a pair of simple relays in combination with a separate scanner switch actuated independently of the relays. This would permit the use of reed-type switches and eliminate the necessity of employing special expensive relays.

The drawings furnished herewith illustrate a preferred mode presently contemplated for carrying out the invention and clearly disclose the advantages heretofore discussed as well as others which will be clear to those skilled in the art.

Figure 1:
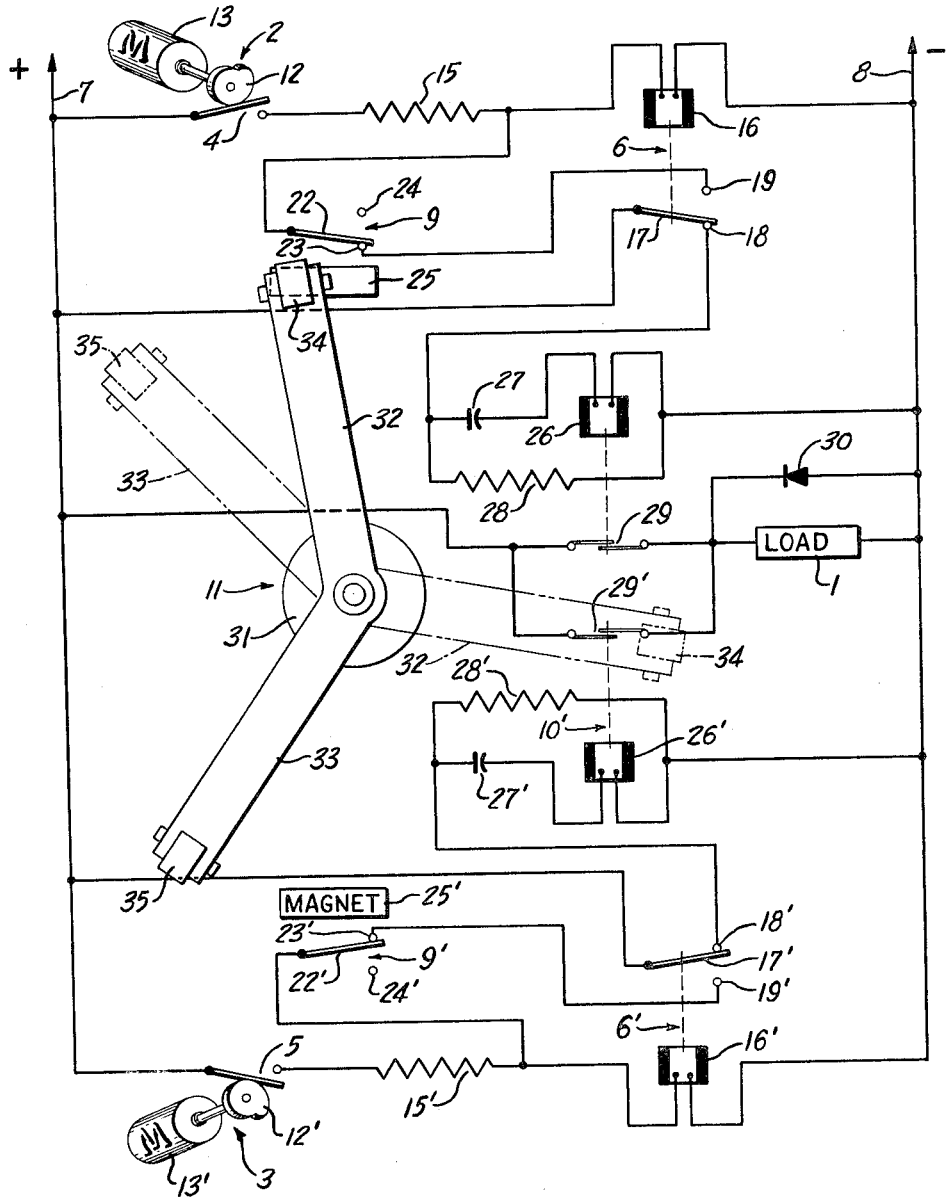
FIG. 1 is a schematic circuit diagram of a counting system which can be incorporated to summate a pair of separate parallel actuated functions which are converted to parallel trains of time spaced electrical pulses.

Referring to the drawings and particularly to FIG. 1, an electrically responsive counter 1 is shown connected to be actuated in accordance with and to summate the timed operation of a pair of operators 2 and 3. For example, operators 2 and 3 can be devices responsive to the gasoline dispensed from a pair of gasoline service station dispensers with the output or total flow being summated to actuate a counter mechanism which will prevent further withdrawal after selected withdrawal unless the counter mechanism is reset, such as diagrammatically shown in the previously referred to copending application of Walter L. Probert.

The operators 2 and 3 are shown connected to actuate pulse forming and transmitting switches 4 and 5, respectively, which are interconnected in accordance with a novel circuit to actuate the counter 1 each time the switch opens and closes. The interconnection of the switch 4 and the actuation thereof by the operator 2 is hereinafter described in detail. The interconnection of operator 3 and the switch 5 is interconnected in the same manner and corresponding elements are identified by corresponding primed numbers for purposes of simplicity and clarity of explanation.

Generally, the transmitting switch 4 is a single-pole, single-throw switch connected in series with a conditioning relay 6 between a pair of low voltage, direct current (D.C.) power leads 7 and 8; for example, 24 volts. The polarity of the leads 7 and 8 is illustrated by the conventional positive sign (+) and negative sign (−) for purposes of describing the operation of the pulsing circuit.

The conditioning relay 6 is connected in a latching circuit with a scanner switch 9 which is magnetically actuated by a magnetic scanner unit 11 to periodically open and close a latching circuit. The conditioning relay 6 is further connected in circuit to control a pulse forming relay 10 which is interconnected to transmit a pulse to the counter 1 in response to each opening and closing of the transmitter switch 4.

The operator 2 for the switch, as diagrammatically illustrated, includes a cam 12 coupled to be driven at a selected maximum rate by a motor 13 which rotates in accordance with a load or function to be recorded. For example, motor 13 may be an output shaft from a register mechanism which in turn is driven from a fluid flow responsive meter forming a part of a conventional gasoline dispenser. The cam 12 is provided with a spiral edge 14 having a sharp drop-off such that the switch 4 will be opened and closed once for each revolution of the cam 12. Th switch 4 is thereby closed and opened once for each unit of flow or other time related function which is coupled to drive motor 13.

Briefly, the operation of circuit of FIG. 1 can be summarized as follows. Closing of the transmitter switch 4 energizes the conditioning relay 6 which is latched in circuit through the scanner switch 9. This actuates the pulse forming relay 10 to establish a signal pulse which actuates the counter 1 to record the closing of the switch 4. When the scanner switch 9 is actuated by the scanner unit 11, the conditioning relay 6 and the pulse forming relay 10 are reset to a standby condition. A subsequent closing of the switch 4 recycles the circuit to again establish pulsed operation of the counter 1. Thus, each complete closing and opening of the scanner switch 4, which is directly related to the timed operation of operator 2, is recorded by counter 1. In order to reset the circuit of the conditioning relay 6, both the transmitting switch 4 and the scanner switch 9 must be simultaneously opened to break both circuits to relay 6 for a period sufficient to allow the conditioning relay 6 to drop out.

More particularly, the single-pole switch 4 is connected between the leads 7 and 8 in series with a current limiting resistor 15 and a coil 16 of the conditioning relay 6. The resistor 15 limits the current through the circuit to prevent any dangerous arcing at the transmitter switch 4. This makes the circuit suitable for use in gasoline dispensers or the like.

In the illustrated embodiment of the invention, the coil 16 of conditioning relay 6 is electromagnetically coupled to a single contact arm 17 which engages a normally closed contact 18 and in response to energizing of coil 16 moves into engagement with a normally open contact 19. In effect, the relay 6 thus controls a pair of switches shown in FIG. 1 with a common member or arm 17 providing a three terminal connection. A relay with separate contact means may of course also be employed.

A lead 20 connects the common contact arm 17 directly to the positive lead 7. A lead 21 connects the normally open or disengaged contact 19 to the scanner switch 9.

Switch 9 is shown as a magnetically actuated switch having a contact arm 22 which is connected to the junction of resistor 15 and coil 16 of conditioning relay 6. Contact arm 22 selectively engages a normally closed contact 23 which is connected to the normally open contact 19 and a dead contact 24. A biasing magnet 25 is shown adjacent the arm 22 and creates a positive force urging the contact arm 22 into engagement with the contact 23. Thus, when the switch 9 is closed and the relay 6 has been energized to transfer contact arm 17 into engagement with contact 19, a latching circuit is created for the relay coil 16 which begins at the positive lead 7 and extends through relay contacts 17 and 19, switch 9 and relay coil 16 to the negative power lead 8. Thus, initial closing or energization of coil 16 by closing of switch 4 latches the coil 16 in circuit to maintain the circuit completed independently of switch 4 until such time as the scanner switch 9 is open. However, when switch 9 is opened to break the latch circuit, the switch 4 must also be opened or relay 6 is held in through switch 4.

When relay 6 is energized, the normally closed contact 18 is disconnected from the positive lead 8 and opens a circuit to the pulse forming relay 10, as presently described.

The relay 10 includes a relay coil 26 connected in series with a capacitor 27 between the normally closed contact 18 of the relay 6 and the negative lead 8. A discharge resistor 28 is connected across the coil 26 and the capacitor 27. In operation, closing of contact arm 17 into engagement with the normally closed contact 18 completes a circuit from the positive lead 7 through the contact arm 17, contact 18, capacitor 27, coil 26 of relay 10 to the negative lead 8. The resistance of coil 26 of relay 10 is such that the current will rise and fall rapidly through the circuit to charge capacitor 27 to the direct current voltage between the leads 7 and 8. This results in the momentary closing of the relay contacts 29 which are connected in series circuit with counter 1 across leads 7 and 8. The circuit will remain in the condition with capacitor 27 fully charged to prevent energizing of relay 10.

When relay 6 is energized, the arm 17 moves from contact 18 and opens the above circuit to capacitor 27 and relay 10. The capacitor 27 discharges through the resistor 28 to reset the circuit. The resistance of resistor 28 is sufficiently high to prevent rapid discharge of the capacitor 27 and pulsing of the relay 10.

The pulse forming relay 10 includes the set of normally open contacts 29 connected in series with the counter 1 across the leads 7 and 8. Each closing of the contacts 29 results in a single actuation of the counter 1 such that pulsed actuation in accordance with the pulsed operation of switch 4 provides an accumulated count of the total actuations of the switch 4 and therefore the operation of actuator 2.

The counter is of any suitable construction and may be a well known electromagnetic counting mechanism including a reverse connected diode 30 connected across the counter.

The transmitter switch 5 is connected through a similar transmitting circuit including the pulse forming relay 10' having the normally open contacts 29' connected in parallel with the contacts 29. Thus, closing of either contact 2 or 29' actuates the counter 1.

To insure sequential actuation by the two transmitting circuits, the scanner unit 11 is interconnected to actuate the scanner switches 9 and 9' in timed sequence such that the two transmitting circuits are actuated in sequence.

In the illustrated embodiment of the invention, a scanner motor 31 is interconnected to drive an armature spider having arms 32 and 33. Scanner magnets 34 and 35 are secured to the outer ends of arms which are displaced by 135° and 225°, respectively, with respect to each other. The scanner magnets 34 and 35 are rotated into sequential alignment with the scanner switches 9 and 9' which are diametrically disposed beneath the path described by the magnets 34 and 35 such that each is actuated twice for each motor or armature revolution.

Motor 31 is a constant speed motor having a speed related to the maximum speed of motors 13 and 13'. Thus, motor 31 must rotate at a speed not less than three-quarters the speed of motors 13 such that each switch is closed once for each revolution of cam 12 and actuation of switch 4.

Cam 12 is selected and designed such that the switch 4 is closed for 135° and opened for 225° during each complete revolution of the cam. The motor 13 is assumed to drive cam 12 at 20 revolutions per minute (r.p.m.) maximum and correspondingly the switch is closed and opened 20 times per minute maximum for purposes of illustration. The scanner motor 31 correspondingly rotates at 20 revolutions per minute which with the two spaced magnets 34 and 35 provide the necessary coordinated operation of the scanner switches 9 and 9' with the related transmitting switches 4 and 4', as follows.

Assume the circuit is in the condition shown in FIG. 1, with the transmitter switch 4 open and conditioning relay 6 de-energized. Contact arm 17 engages contact 18 and completes the circuit through the coil 26 of the relay 10 which creates and maintains a full charge on the capacitor 27. After a full charge condition is established as shown, the relay contacts 29 of relay 10 are open, as shown in FIG. 1. Motor 13 rotates at any speed up to 20 r.p.m. in accordance with a desired load or the like and the switch 4 opens and closes accordingly, with each closure spanning 135° of cam rotation and the switch 4 returning to the open position for the other 225°. During the closing of the switch 4, current is supplied to the coil 16 which pulls in its contacts and moves the contact arm 17 from contact 18 to the contact 19. The closing of the contact 19 establishes the latching circuit previously described through the switch 9 to maintain the coil 16 energized. The opening of contact 18 results in removal of power from the capacitor 27 which will therefore discharge through the resistor 28 at a rate, however, which is insufficient to pulse the relay 10. Thus, the voltage applied to the relay 10 is insufficient to pull in contacts 29.

The scanner magnet 34 is shown initially to the left side of the switch 9 and the switch 4 has opened by the time the magnet 35 has moved into engagement with the switch 9. The scanner unit 11 thus rotates the spider arm 32 to align the leading magnet 35 with the switch 9 and cause the contact arm 22 to disengage contact 23 and engage the dead contact 24. This opens the latch circuit to conditioning relay 6 which is de-energized, assuming switch 4 is also open. The relay 6 then drops out and contact arm 17 engages contact 18 to complete the circuit to the pulse forming relay 10 and capacitor 27. As as result, a rapid current pulse flows through the relay 10 with voltage momentarily applied thereto to cause a closing of the contacts 29 sufficiently long to actuate the counter 1.

To further explain the circuit operation, the magnets 34 and 35 are shown in phantom in an alternate position with magnet 34 to the right of the switch 9 by approximately 100° and magnet 35 spaced to the left side of switch 9 by approximately 35°. If the switch 4 is closed at this instance, it will be in the closed position when magnet 35 is aligned with the switch 9 because, as previously described, it is held closed for 135° and open for 225°. Although the switch 9 will open and break the latching circuit to relay 6, a circuit to relay 6 is maintained through the closed transmitter switch 4. Consequently, the opening of the switch 9 does not result in resetting of the circuit and pulsing of counter 1. However, after magnet 35 leaves the switch 9, the switch 4 opens and remains so for 225°. The magnet 34 is spaced from the switch 9 by less than 225° when switch 4 opens and thus moves into alignment with and opens switch 9 to effect a resetting of the circuit and consequently the necessary pulsing action for the single closure of the switch 4.

In summary, the switching periods of the scanner switch 9 and the transmitter switch 4 are caused to overlie such that both switches will have a coincident open period for each revolution of the cam 12. This is necessary to prevent a loss of count.

Although a single scanning magnet or other suitable operator may be employed, it would have to rotate at a higher speed to insure proper simultaneous opening of the scanner switch with the transmitting switch.

Figure 4:
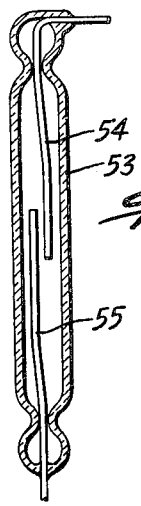
FIG. 4 is a sectional view through a reed switch particularly appropriate for the previously described embodiment.

The relays may be conventional direct current relays which are inexpensive and readily available or any other similar functioning devices. The transmitting switch 4 may be a simple mechanical type switch or a reed switch such as also preferably employed for switch 9 and typically shown in FIG. 4. Broadly the switches can be any circuit altering means separate from relay 6 which functions periodically to effectively open and close the related circuit to provide the described sequential circuit operation.

Figure 2:
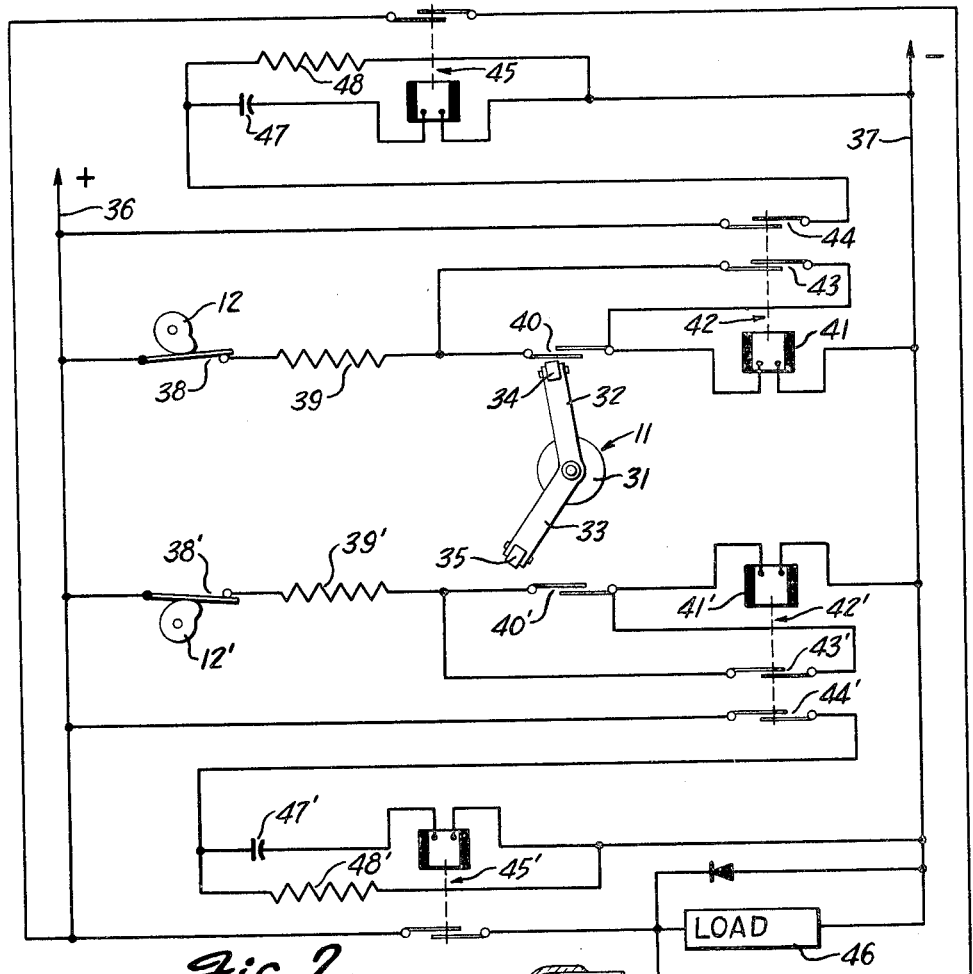
FIG. 2 is a similar schematic illustration showing a counting system employing a normally closed transmitter switch.

Referring particularly to FIG. 2, an alternative embodiment of the invention is shown generally similar to FIG. 1 and with certain components similarly numbered for simplicity of explanation. The circuit of FIG. 2 similarly records the operation of a pair of loads as reflected in rotation of cams 12 and 12'. The circuit for cam 12 is described and corresponding elements for cam 12' are identified by primed numbers. The circuit of FIG. 2 includes suitable D.C. power lines 36 and 37 with a normally closed transmitting switch 38 in series with a safety resistor 39, a normally open scanner switch 40 and a coil 41 of a conditioning relay 42 connected between the power lines. In FIG. 2, the conditioning relay 42 controls two sets of normally open relay switches or contacts 43 and 44. Contacts 43 are connected in parallel with the scanner switch 40 while the normally open contacts 44 are connected in circuit with a pulse relay 45 and capacitor 47 and a discharge resistor 48, in the same manner as the pulse forming circuit of FIG. 1. The pulse forming circuit actuates relay 45 in the same manner as that previously described with the pulse forming relay 10 to operate load 46.

In the circuit of FIG. 2, the scanner switch 40 is normally open and consequently maintains the relay 42 de-energized until such time as the transmitter switch 38 is in its normally closed position and scanner magnet 34 or 35 is aligned with the switch 40 to hold it in a closed position for a period sufficiently long to energize coil 41. Thus, the switching period of switches 38 and 40 must be selected to overlap for each revolution of cam 12, generally as in the circuit of FIG. 1, but in FIG. 2 in order to produce energization of conditioning relay 42. Once energized, the relay 42 is latched in through the contacts 43 the normally closed transmitter switch 38. In the second embodiment, the energizing of conditioning relay 42 closes the switch 44 to complete the pulsing circuit and transmit a pulse to the load or counter 46. The circuit is reset when the transmitter switch 38 opens.

Figure 3:
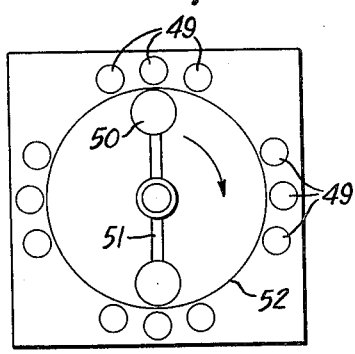
FIG. 3 is a diagrammatic view of a transmitting module constructed in accordance with the present invention for a multiple product system.

As noted, the present invention employs a separate scanner switch independent of the relay structure, as a result, small miniature transmitting reed switches can be employed and the circuit can be interconnected to provide multiple load actuations. For example, referring particularly to FIG. 3, a diagrammatic illustration of a module is shown wherein the three separate counters or other loads can be actuated in accordance with a plurality of four different transmitters or operators per load. In FIG. 3, 12 reed switches 49 are shown disposed in circumferentially distributed groups of three separated by substantially 90° with each of the correspondingly positioned switches in each group interconnected to actuate a corresponding load. A single magnet 50 is carried by an armature 51 interconnected to a timing or scanner motor 52. The motor 52 will rotate at the same maximum rate as the actuation of the corresponding reed switches; for example, 20 revolutions per minute.

Each of the reed switches will be connected in a separate pulse transmitting circuit such as previously described with respect to FIGS. 1 and 2 and provides for sequential transmission of stored pulses to the three separate loads in accordance with the operation of the several operating means. This aspect of the invention provides a very compact structure which can be employed to reduce the cost for a multiple product system; for example, a service station having three different petroleum products each of which is dispensed through a plurality of individual dispensing elements or members.

Reed switches 49 are well known units and may be any suitable construction. A typical illustration is given in FIG. 4 wherein a tubular glass shell 53 has its outer ends sealed about the outer ends of leaf spring contacts 54 and 55, respectively. Contacts 54 and 55 project inwardly from shell 53 into overlapping relation and may be either normally open or closed. If the contacts are normally open, as in the embodiment of FIG. 1, alignment of a permanent magnet therewith induces unlike poles such that the contacts are attracted to a closed or conducting position. They return to the normally open position as a result of the resiliency of the contact arms. In normally closed units, such as shown in FIG. 1, a bias magnet may urge the contacts to the closed position with the scanner magnet creating an opposing field to neutralize the magnet field and thereby allow the switch to open under the inherent resiliency of the contacts.

The present invention more broadly provides a simplified pulse transmitting circuit which will maintain a reliable count of a plurality of time operated paralleled load devices without sacrifice of the reliability and long life of other systems.

Various modes of carrying out the invention are contemplated as being within the scope of the following claims particularly pointing out and distinctly claiming the subject matter which is regarded as the invention.

I claim:

1. A signal transmitting circuit for transmitting a plurality of trains of pulse signals, each train having a selected maximum repetition rate and being generated at different ones of a plurality of sources, comprising
   intermittently operated circuit altering means, one for each source and having input means for coupling to the corresponding source,
   a conditioning relay means, one for each circuit altering means and having coil means connected in an energizing circuit with the corresponding switch means and contact means controlled by the coil means,
   separate scanner switch means, one for each source and interconnected in a circuit with the corresponding conditioning relay coil means and contact means to conjointly control the energization of the coil means, said switch means being biased to selected circuit positions,
   scanning means sequentially and momentarily actuating said switch means from said selected circuit position to a second circuit position,
   pulse forming circuits, one for each load switch means and each including contact means controlled by the corresponding conditioning relay whereby cyclic energization and de-energization of the conditioning relay is required for cyclic operation of each pulse forming circuit, and
   a load means connected in circuit with each pulse forming circuit for similar actuation by each thereof.

2. The signal transmitting circuit of claim 1 for a pair of sources, wherein
   said load switch means are open for a selected portion of a cyclic at the maximum repetition rate,
   said scanner switches are circumferentially and oppositely spaced,
   said scanning means is a rotating unit having a pair of switch operators displaced by the number of degrees generally corresponding to said selected portion, and
   said rotating member rotates at an angular velocity corresponding to the maximum repetition pulse rate.

3. The signal transmitting circuit of claim 2 wherein,
   said scanner switches are magnetically responsive reed switches, and
   said switch operators are permanent magnets.

4. A signal transmitting circiut for transmitting a plurality of trains of pulse signals having a selected maximum repetition rate and generated at a plurality of sources, comprising
   intermittently operated load switch means having a conducting position and a non-conducting position and one of said positions being a normal standby position, one for each source and each having input means for coupling to the corresponding source,
   scanner switch means having a conducting position and a non-conducting position, one for each source,
   a conditioning relay means, one for each load switch means and having coil means interconnected in paralleled energizing circuit with the corresponding load switch means and the scanner switch means whereby energization thereof is conjointly controlled by said switch means,
   scanning means to sequentially and momentarily actuate said scanner switch means from the standby position to the alternate position, said actuation being in timed relation to and at a rate related to the maximum actuation of the load switch means,
   pulse forming circuits, one for each load switch means and each including contact means controlled by the corresponding conditioning relay whereby cyclic energization and de-energization of the conditioning relay is required for cyclic operation of each pulse forming circuit, said load switch means and said scanner switch means being connected and arranged to require simultaneous similar positions for a selected time period during a cycle of the load switch means to cycle the conditioning relay, and
   a load means connected in circuit with each pulse forming circuit for similar actuation by each thereof.

5. A signal transmitting circuit for transmitting parallel trains of pulse signals having a maximum repetition rate, comprising
   normally open transmitting switches, one for each pulse train and having means cyclically opening and closing the switches to form the pulse train with a selected maximum repetition rate,
   conditioning relays, one for each transmitter switch and connected in a series energizing circuit with a corresponding transmitter switch, each of said relays having a normally open contact means and a normally closed contact means,
   a separate scanner switch for each transmitter switch, said switches being reed switches,
   a latch circuit for each conditioning relay including its own normally open contact means and a corresponding separate scanner switch,
   a scanning means having a permanent magnet sequentially and cyclically aligned with all of the scanner switches to intermittently close the same in sequence,
   pulse forming circuits one for each transmitting switch and each including the corresponding normally closed contact means of the conditioning relay and establishing a pulse train in accordance with the cyclic opening and closing of the normally closed contact means, and a summating means having the outputs of the pulse forming circuits connected in parallel.

6. A signal transmitting circuit for transmitting parallel trains of pulse signals having a maximum repetition rate, comprising normally open transmitter switches, one for each pulse train and having means cyclicals opening and closing the switches to form the pulse train with a selected maximum repetition rate, conditioning relays, one for each transmitter switch and connected in a series energizing circuit with a corresponding transmitter switch, each of said relays having a normally open contact means and a normally closed contact means, separate scanner switches, one for each transmitter switch, a latch circuit for each conditioning relay including its own normally open contact means and a corresponding separate scanner switch, a scanning means to sequentially and cyclically close the scanner switches, pulse forming circuits one for each transmitting switch and each including the corresponding normally closed contact means in series with a capacitor and a pulse forming relay and with a discharge resistor connected across the capacitor and the pulse forming relay, the pulse forming relays each having a set of normally open contacts, and a summating means connected in an energizing circuit having the contacts of the pulse forming relays connected in parallel.

7. The signal transmitting circuit of claim 6, wherein said scanner switches are magnetically responsive, and said scanning means include at least one permanent magnet cyclically movable between said scanner switches.

8. The signal transmitting circuit of claim 6 for a pair of sources, wherein said scanner switches are circumferentially spaced by 180 degrees, said scanning means is a rotating member having a pair of switch operators displaced by 135 degrees, and said rotating member rotates at an angular velocity corresponding to the maximum repetition pulse rate.

9. A signal transmitting circuit for transmitting signals from a plurality of sources, comprising normally closed transmitter switches, one for each source and having means for coupling to the corresponding source for repetitious opening and closing at a selected maximum repetition rate, scanner switches, one for each source, conditioning relays, one for each source and connected in a series energizing circuit with a corresponding transmitter switch and a scanner switch, each of said relays having first normally open contact means and second normally open contact means, a latch circuit in parallel with each scanner switch and including said first-named normally open contact means, a scanning means to sequentially and cyclically close the scanner switches, pulse forming circuits, each including a different one of the second normally open contact means of the conditioning relays, and a summating means connected in an energizing circuit with the outputs of the pulse forming circuits.

10. The transmitting circuit of claim 9 wherein the pulse forming circuit includes a capacitor in series with relays and resistors in parallel with the capacitor and the relay.

11. A transmitting circuit for a plurality of trains of pulse signals having a selected maximum repetition rate and generated at a plurality of sources, said sources being divided into related groups each of which is to drive a related device, comprising intermittently operated load switch means, one for each source and having input means for coupling to the corresponding source, a conditioning relay means, one for each switch means and having coil means connected in an energizing circuit with the corresponding switch means, switches, one for each source and interconnected in a circuit with the corresponding conditioning relay means to conjointly control the energization thereof, means to mount said switches in spaced relation with the switches divided in accordance with the related groups and similarly arranged within each group, magnet scanning means to sequentially and momentarily actuate said switches in timed relation to and at a rate related to the maximum actuation rate of the load switch means, pulse forming circuits, one for each load switch means and each including contact means controlled by the corresponding conditioning relay whereby cyclic energization and de-energization of the conditioning relay is required for cylic operation of each pulse forming circuit, and load devices, one for each group and connected in circuit with the related pulse forming circuits for similar actuation by each thereof.

12. The circuit of claim 11 wherein said switches are reed switches mounted on end with the scanning means moving thereover.

13. The circuit of claim 12 wherein said groups are circumferentially spaced and the scanning means includes a rotating scanner supporting a permanent magnet which passes over the ends of the reed switches to actuate the same.

No references cited.

NEIL C. READ, *Primary Examiner.*

T. H. HABECKER, *Assistant Examiner.*